(12) United States Patent
Nakamura et al.

(10) Patent No.: US 8,817,654 B2
(45) Date of Patent: Aug. 26, 2014

(54) RADIO CONTROLLER AND MOBILE COMMUNICATION METHOD

(75) Inventors: Yuichiro Nakamura, Zushi (JP);
Yasuhiro Kawabe, Yokosuka (JP);
Masafumi Masuda, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 230 days.

(21) Appl. No.: 13/147,029

(22) PCT Filed: Jan. 29, 2010

(86) PCT No.: PCT/JP2010/051243
§ 371 (c)(1),
(2), (4) Date: Oct. 7, 2011

(87) PCT Pub. No.: WO2010/087441
PCT Pub. Date: Aug. 5, 2010

(65) Prior Publication Data
US 2012/0039211 A1    Feb. 16, 2012

(30) Foreign Application Priority Data

Jan. 30, 2009 (JP) .................................. 2009-019783

(51) Int. Cl.
*H04W 24/00* (2009.01)
*H04L 12/26* (2006.01)

(52) U.S. Cl.
USPC ........................................................ 370/253

(58) Field of Classification Search
USPC ........................................................ 370/253
See application file for complete search history.

(56) References Cited

U.S. PATENT DOCUMENTS

| 7,885,662 | B2 * | 2/2011 | Lindoff et al. | 455/450 |
|---|---|---|---|---|
| 2003/0007456 | A1 * | 1/2003 | Gupta et al. | 370/232 |
| 2003/0171129 | A1 * | 9/2003 | Sagne | 455/517 |
| 2004/0081097 | A1 * | 4/2004 | Dominique et al. | 370/232 |
| 2006/0268717 | A1 * | 11/2006 | Kanterakis | 370/235 |
| 2006/0291582 | A1 * | 12/2006 | Walton et al. | 375/267 |
| 2007/0049191 | A1 * | 3/2007 | Tomobe et al. | 455/3.01 |
| 2007/0049308 | A1 | 3/2007 | Lindoff et al. | |

(Continued)

FOREIGN PATENT DOCUMENTS

| EP | 1908228 | * | 4/2008 |
|---|---|---|---|
| JP | 2003 513534 | | 4/2003 |

(Continued)

OTHER PUBLICATIONS

Japanese Office Action Issued Jul. 31, 2012 in Patent Application No. 2010-548565 (with English translation).

(Continued)

*Primary Examiner* — Brandon Renner
*Assistant Examiner* — Faisal Choudhury
(74) *Attorney, Agent, or Firm* — Oblon, Spivak, McClelland, Maier & Neustadt, L.L.P.

(57) ABSTRACT

A radio controller 03 of the present invention includes a threshold value holding unit 11 configured to associate a traffic channel configuration with at least one threshold value and hold these associated traffic channel configuration and threshold value, a threshold value extraction unit 13 configured to extract at least one threshold value associated with a traffic channel configuration of a mobile station and a threshold value determination unit 14 configured to determine whether or not to change the traffic channel configuration of the mobile station by comparing the extracted threshold value with a communication state at a predetermined timing.

7 Claims, 4 Drawing Sheets

(56) References Cited

U.S. PATENT DOCUMENTS

| | | |
|---|---|---|
| 2007/0060156 A1* | 3/2007 | Cave .............................. 455/450 |
| 2007/0147370 A1 | 6/2007 | Hasegawa |
| 2008/0240060 A1* | 10/2008 | Janakiraman et al. ........ 370/338 |
| 2009/0190517 A1* | 7/2009 | Maezawa ....................... 370/312 |
| 2010/0098051 A1* | 4/2010 | Uemura ......................... 370/350 |
| 2010/0223524 A1* | 9/2010 | Duggan et al. ................ 714/751 |
| 2011/0242990 A1* | 10/2011 | Simonsson et al. ........... 370/242 |

FOREIGN PATENT DOCUMENTS

| | | |
|---|---|---|
| JP | 2004 32211 | 1/2004 |
| JP | 2007 174471 | 7/2007 |
| WO | WO2007/011281 A1 | 1/2007 |
| WO | 2007 039361 | 4/2007 |

OTHER PUBLICATIONS

International Search Report issued Mar. 23, 2010 in PCT/JP10/051243 filed Jan. 29, 2010.

3GPP TS 25.331 V10.4.0, "3rd Generation Partnership Project: Technical Specification Group Radio Access Network; Radio Resource Control (RRC); Protocol Specification (Release 10)," 3GPP™, pp. 1-1880, (Jun. 2011).

Chinese Office Action issued Jun. 18, 2013, in China Patent Application No. 201080006282.6 (with English translation).

Office Action issued Mar. 5, 2014 in Chinese Patent Application No. 201080006282.6 with English translation.

* cited by examiner

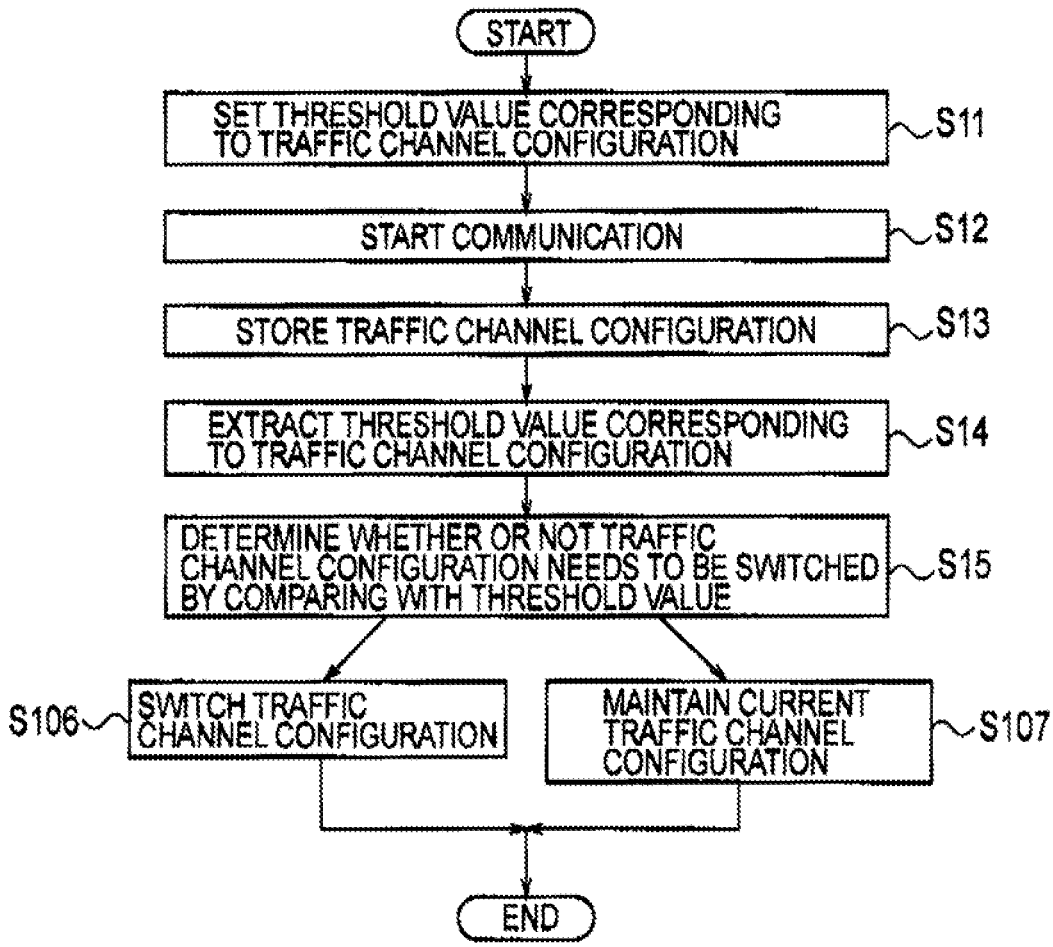

| TRAFFIC CHANNEL CONFIGURATION | THRESHOLD VALUE 1 (DATA FLOW RATE) | THRESHOLD VALUE 2 (CC UTILIZATION RATE) | THRESHOLD VALUE 3 (NUMBER X OF DETERMINATIONS) | THRESHOLD VALUE 4 (TIMER Y) |
|---|---|---|---|---|
| 1 | 1-A | 2-A | X-A | Y-A |
| 2 | 1-B | 2-B | X-B | Y-B |
| 3 | 1-C | 2-C | X-C | Y-C |
| 4 | 1-D | 2-D | X-D | Y-D |
| 5 | 1-E | 2-E | X-E | Y-E |

RADIO CONTROLLER AND MOBILE COMMUNICATION METHOD

TECHNICAL FIELD

The present invention relates to a radio controller and a mobile communication method.

BACKGROUND ART

In recent years, 3GPP (3rd Generation Partnership Projects) has specified a mobile communication system called a W-CDMA (Wideband-Code Division Multiple Access) system (or a UMTS: Universal Mobile Telecommunications System) based on CDMA (Code Division Multiple Access) technologies.

There has also been specified a system for increasing a data transmission rate in the W-CDMA system. A system for increasing a downlink data transmission rate is called "HSDPA (High Speed Downlink Packet Access)".

In the W-CDMA system, a mobile station UE (User Equipment) has communication states, which are called a "CELL_FACH" state and a "CELL_DCH" state.

In the "CELL_FACH" state, multiple mobile stations UEs execute communication while sharing one radio channel (hereinafter referred to as an FACH: Forward Access Channel). The "CELL_FACH" state is often used when a high transmission rate is not required. However, the "CELL_FACH" state achieves high radio resource utilization efficiency since the multiple mobile stations UE use one FACH as needed.

The "CELL_DCH" state is different from the "CELL_FACH" state, and is a state where one mobile station UE occupies one radio channel (hereinafter referred to as a DCH: Dedicated Channel) for communication. In the "CELL_DCH" state, each of the mobile stations UE can stably perform relatively high-speed communication, and also serviceability is high. However, the radio resource utilization efficiency is not good since each mobile station UE occupies the corresponding DCH even if the mobile station UE has no data to be transmitted.

In the "CELL_DCH" state, uplink DCCH (Dedicated Control Channel) data (uplink control signal data), downlink DCCH data (downlink control signal data), uplink DTCH (Dedicated Traffic Channel) data (uplink user data or uplink U-Plane data) or downlink DTCH data (downlink user data or downlink U-Plane data) is transmitted on the DCH.

Meanwhile, in the HSDPA, a shared radio channel (hereinafter referred to as a HS-DSCH: High Speed-Downlink Shared Channel) is used to transmit downlink DTCH data, as in the case of the "CELL_FACH" state.

The HSDPA enables the efficient use of radio resources while increasing the downlink data transmission rate by following changes in propagation environment so quickly with high-speed control in the lower layer and by controlling the downlink data transmission rate according to the radio quality of each mobile station UE.

Moreover, in the HSDPA, the uplink DCCH data, the downlink DCCH data or the uplink DTCH data is transmitted on the DCH (A-DPCH to be described later), while the downlink DTCH data is transmitted on the HS-DSCH.

Here, the DCH for transmitting the uplink DCCH data, downlink DCCH data or the uplink DTCH data is called "A-DPCH (Associated Dedicated Physical Channel)", meaning "DCH associated with the HS-DSCH".

In the HSDPA, there has been specified a method for transmitting downlink DCCH data using not the A-DPCH but the HS-DSCH. Such a method can contribute to the improvement in radio resource utilization efficiency, and can also reduce connection delay time for establishing a radio channel between the mobile station UE and a radio controller by transmitting the downlink DCCH data at high speed.

Note that when transmitting the downlink DCCH data using the HS-DSCH, only data notifying transmission power in uplink communication (pilot signal data for transmission power control, hereinafter referred to as TPC (Transmission Power Control) bits) needs to be transmitted through another downlink channel in order to follow changes in propagation environment at high speed.

Such a downlink channel for transmitting only the TPC bits is called an "F-DPCH (Fractional-DPCH)", and ten mobile stations UE can be multiplexed on one F-DPCH. When the F-DPCH is used, CC (Channelisation Code) utilization efficiency is improved by up to ten times comparing with the case where the A-DPCH is used.

Moreover, in the W-CDMA system, an "RLC (Radio Link Control) function" is specified as a layer-2 function for radio link control. Here, the RLC function is configured to execute delivery confirmation and retransmission control.

A data size (hereinafter referred to as RLC-PDU size) of each of the blocks separated by the RLC function is usually 42 octets, but may be 82 octets. Setting the RLC-PDU size to 82 octets enables more data to be transmitted per unit time, thereby enabling an increase in data transmission rate.

As a result of the consideration that the RLC-PDU size is set to 82 octets to further improve the downlink data transmission rate, communication using the RLC-PDU size of 82 octets can be performed using either the transmission method using the A-DPCH or the transmission method using the F-DPCH. Note that, in the "CELL_FACH" state or the "CELL_DCH" state, a specified transmission rate can be sufficiently satisfied even if the RLC-PDU size is 42 octets.

In such a mobile communication system, the radio controller generally performs channel switch control to allocate a suitable traffic channel to the mobile station UE according to the usage situation of the radio resources.

For example, the radio controller observes a flow rate of user data to the mobile station UE, and performs the channel switch control in the following manner. Specifically, if the flow rate of the user data to the mobile station US is high, the mobile station UE performs communication using the OCR or the HS-DSCH. On the other hand, if the flow rate of the user data to the mobile station UE is low, the mobile station UE performs communication using the FACH.

PRIOR ART DOCUMENT

Non-Patent Document

Non-Patent Document 1: 3GPP TS25.331

SUMMARY OF THE INVENTION

Problem to be Solved by the Invention

In the conventional mobile communication system, when the HSDPA communication is performed using the A-DPCH, it is preferable, from the viewpoint of radio resource utilization efficiency, that the communication state is promptly changed to the "CELL_FACH" state in such a case as where the data flow rate is low. On the other hand, when the HSDPA communication is performed using the F-DPCH, it is preferable that the communication state is not changed to the "CELL_FACH" state if possible, since the radio resource utilization efficiency is not low and the RLC-PDU size is changed.

However, the conventional mobile communication system has a problem that no consideration is given for execution of the channel switch control while taking into account the traffic channel configuration of the mobile station UE as described above.

Therefore, the present invention was made in consideration of the above problem. It is an objective of the present invention to provide a radio controller and a mobile communication method which are capable of executing flexible channel switch control in consideration of a traffic channel configuration of a mobile station, radio resource utilization efficiency and serviceability.

Means for Solving the Problem

The first feature of the present invention is summarized in that a radio controller including a threshold value holding unit configured to associate a traffic channel configuration with at least one threshold value and hold these associated traffic channel configuration and threshold value, a threshold value extraction unit configured to extract at least one threshold value associated with a traffic channel configuration of a mobile station, and a threshold value determination unit configured to determine whether or not to change the traffic channel configuration of the mobile station by comparing the extracted threshold value with a communication state at a predetermined timing.

The second feature of the present invention is summarized in that a mobile communication method including the steps of extracting, by a radio controller, at least one threshold value associated with a traffic channel configuration of a mobile station from a threshold value holding unit, determining, by the radio controller, whether or not to change the traffic channel configuration of the mobile station by comparing the extracted threshold value with a communication state at a predetermined timing, and changing the traffic channel configuration of the mobile station depending on the determination result.

Effects of the Invention

As described above, the present invention can provide a radio controller and a mobile communication method which are capable of executing flexible channel switch control in consideration of a traffic channel configuration of a mobile station, radio resource utilization efficiency and serviceability.

BRIEF DESCRIPTION OF THE DRAWINGS

FIG. 3 is a diagram showing an example of contents held by a threshold value holding unit in the radio controller according to the first embodiment of the present invention.

FIG. 4 is a flowchart showing an operation of the mobile communication system according to the first embodiment of the present invention.

MODES FOR CARRYING OUT THE INVENTION (Configuration of Mobile Communication System According to First Embodiment of the Present Invention)

Figure 1:
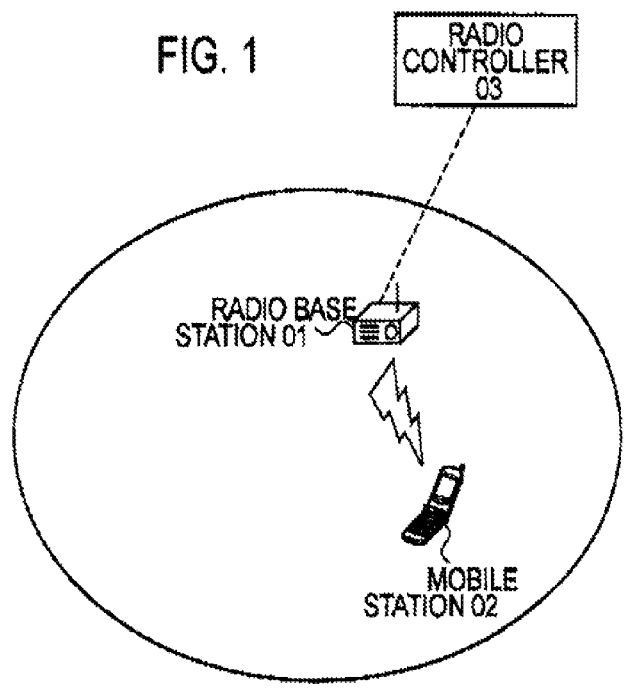
FIG. 1 is an overall configuration diagram of a mobile communication system according to a first embodiment of the present invention.
Figure 2:
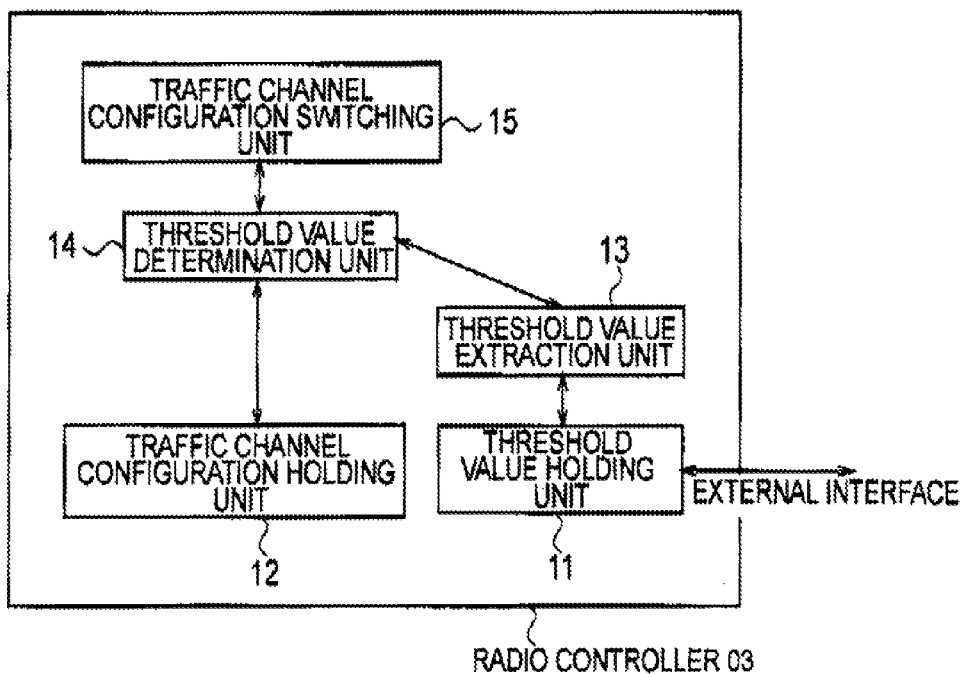
FIG. 2 is a functional block diagram of a radio controller according to the first embodiment of the present invention.

With reference to FIGS. 1 through 3, description is given of a configuration of a mobile communication system according to a first embodiment of the present invention.

As shown in FIG. 1, the mobile communication system according to this embodiment includes a mobile station 02 having a radio communication function, a radio base station 01 having a radio communication function to communicate with the mobile station 02, and a radio controller 03 connected to the radio base station 01 and configured to perform a radio control operation, thereby realizing a mobile communication service.

Note that the mobile communication system according to this embodiment generally includes multiple radio base stations and radio controllers, multiple hierarchical exchange stations and a device such as a home memory (HLR: Home Location Register) for storing subscriber information. However, description thereof is omitted in this specification.

Meanwhile, in a service area provided by the mobile communication system, HSDPA communication can be performed, Specifically, both HSDPA communication using A-DPCH and HSDPA communication using F-DPCH can be performed. Moreover, HSDPA communication using an RLC-PDU size of 42 octets and HSDPA communication using an RLC-PDU size of 82 octets can be performed.

In the mobile communication system, when the mobile station UE starts communications, either the HSDPA communication using A-DPCH or the HSDPA communication using F-DPCH is set, and thereafter switching between the HSDPA communication using A-DPCH and the HSDPA communication using F-DPCH may be disabled.

Moreover, in the mobile communication system, when the mobile station UE starts communications, either the HSDPA communication using A-DPCH or the HSDPA communication using F-DPCH is set, and thereafter switching between the HSDPA communication using A-DPCH and the HSDPA communication using F-DPCH may be enabled.

Further, in the mobile communication system, the mobile station UE having only the ability to perform either the HSDPA communication using A-DPCH or the HSDPA communication using F-DPCH is provided with HSDPA communication commensurate with the ability of the mobile station UE.

Furthermore, in the mobile communication system, when the mobile station UE starts communications, either the HSDPA communication using the RLC-PDU size of 42 octets or the HSDPA communication using the RLC-PDU size of 82 octets is set, and thereafter switching between the HSDPA communication using the RLC-PDU size of 42 octets and the HSDPA communication using the RLC-PDU size of 82 octets may be disabled.

Moreover, in the mobile communication system, when the mobile station UE starts communications, either the HSDPA communication using the RLC-PDU size of 42 octets or the HSDPA communication using the RLC-PDU size of 82 octets is set, and thereafter switching between the HSDPA. communication using the RLC-PDU size of 42 octets and the HSDPA communication using the RLC-PDU size of 82 octets may be enabled.

Further, in the mobile communication system, the mobile station UE having only the ability to perform either the HSDPA communication using the RLC-PDU size of 42 octets or the HSDPA communication using the RLC-PDU size of 82 octets is provided with HSDPA communication commensurate with the ability of the mobile station UE.

Furthermore, in the mobile communication system, the mobile station UE can perform communications in a "CELL_FACH" state and in a "CELL_DCH" state. During the communications in the "CELL_FACH" state and in the "CELL_DCH" state, the RLC-PDU size is 42 octets.

As shown in FIG. 2, the radio controller 03 according to this embodiment includes a threshold value holding unit 11, a traffic channel configuration holding unit 12, a threshold value extraction unit 13, a threshold value determination unit 14, and a traffic channel configuration switching unit 15.

Note that the functions of the radio controller 03 according to this embodiment may be provided in a radio network controller RNC in the W-CDMA system, or in a gateway device accommodating the multiple radio base stations 01 as femto radio base stations, or in a radio base station eNB in an LTE (Long Term Evolution) mobile communication system.

The threshold value holding unit 11 is configured to associate each of traffic channel configurations with at least one threshold value and hold these associated traffic channel configurations and threshold values.

In this embodiment, as shown in FIG. 3, the threshold value holding unit 11 is configured to hold a table in which "Traffic channel Configuration" is associated with "Threshold Value 1".

Here, identifiers specifying the respective traffic channel configurations can be set in the "Traffic channel configuration". In the example shown in FIG. 3, the identifier of the traffic channel configuration for executing the HSDPA communication using the RLC-PDU size of 82 octets and using A-DPCH is "1", the identifier of the traffic channel configuration for executing the HSDPA communication using the RLC-PDU size of 82 octets and using F-DPCH is "2", the identifier of the traffic channel configuration for executing the HSDPA communication using the RLC-PDU size of 42 octets and using A-DPCH is "3", the identifier of the traffic channel configuration for executing the HSDPA communication using the RLC-PDU size of 42 octets and using F-DPCH is "4", and the identifier of the traffic channel configuration for executing the communication in the "CELL_DCH" state is "5".

Meanwhile, a data flow rate in the radio controller 03 can be set in the "Threshold Value 1". Here, the data flow rate may be the number of data blocks to be transmitted and received by the radio controller 03, or may be the number of data blocks to be transmitted and received per unit time by the radio controller 03 (i.e., transmission and reception rate).

In the example shown in FIG. 3, threshold values "1-A" to "1-E" are held corresponding to the identifiers "1" to "5" of the respective traffic channel configurations, respectively.

Also, the contents held by the threshold value holding unit 11 can be externally changed through an external interface.

The traffic channel configuration holding unit 12 is configured to hold information on the traffic channel configuration of each mobile station UE conducting communication. The traffic channel configuration holding unit 12 may be configured to update the held contents when each mobile station UE starts communication or when the traffic channel configuration of the mobile station UE is changed.

The threshold value extraction unit 13 is configured to extract at least one threshold value associated with the traffic channel configuration of the mobile station UE, and to hand over the extracted threshold value to the threshold value determination unit 14. In this embodiment, the threshold value extraction unit 13 is configured to extract the threshold value 1 associated with the traffic channel configuration of the mobile station UE, and to hand over the threshold value 1 to the threshold value determination unit 14.

The threshold value determination unit 14 is configured to determine whether or not to change the traffic channel configuration of the mobile station UE by comparing the threshold value 1 extracted by the threshold value extraction unit 13 with the communication state at a predetermined timing.

Here, it can be assumed that the communication state is the data flow rate described above, radio resource utilization rate (such as CC utilization rate), the number of determinations made by the threshold value determination unit 14, a timer value to be reset when determination is made by the threshold value determination unit 14, or the like.

In this embodiment, the threshold value determination unit 14 may be configured to determine whether or not to change the traffic channel configuration of the mobile station UE by comparing the threshold value 1 extracted by the threshold value extraction unit 13 with the data flow rate.

Specifically, in the case where the data flow rate is below the threshold value 1 extracted by the threshold value extraction unit 13 when the mobile station UE is performing the HSDPA communication or the communication in the "CELL_DCH" state, the threshold value determination unit 14 is configured to determine that the traffic channel configuration of the mobile station UE should be changed to the traffic channel configuration for executing the communication in the "CELL_FACH" state, i.e., the communication state of the mobile station UE should be changed to the "CELL_FACH" state.

On the other hand, in the case where the data flow rate is not below the threshold value 1 extracted by the threshold value extraction unit 13 when the mobile station UE is performing the HSDPA communication or the communication in the "CELL_DCH" state, the threshold value determination unit 14 is configured to determine that the traffic channel configuration of the mobile station UE should not be changed to the traffic channel configuration for executing the communication in the "CELL_FACH" state, i.e., the communication state of the mobile station UE should not be changed to the "CELL_FACH" state.

Here, the threshold value determination unit 14 may be configured to determine whether or not to change the traffic channel configuration of the mobile station UE as described above when the mobile station UE starts communication or when the traffic channel configuration of the mobile station UE is to be changed.

The traffic channel configuration switching unit 15 is configured to switch the traffic channel configuration of each mobile station UE according to the result of the determination made by the threshold value determination unit 14.

(Operations of Mobile Communication System According to First Embodiment of the Present Invention)

With reference to FIGS. 4 through 7, description is given of operations of the mobile communication system according to the first embodiment of the present invention.

As shown in FIG. 4, in Step S11, the radio controller 03 is set to associate a traffic channel configuration with at least one threshold value and hold these associated traffic channel configuration and threshold value.

When the mobile station UE starts communication in Step S12, the radio Controller 03 stores the traffic channel configuration of the mobile station UE in Step S13. Here, the communication state of the mobile station UR is not the "CELL_FACH" state.

In Step S14, the radio controller 03 extracts the threshold value associated with the traffic channel configuration of the mobile station UE.

Figure 5:
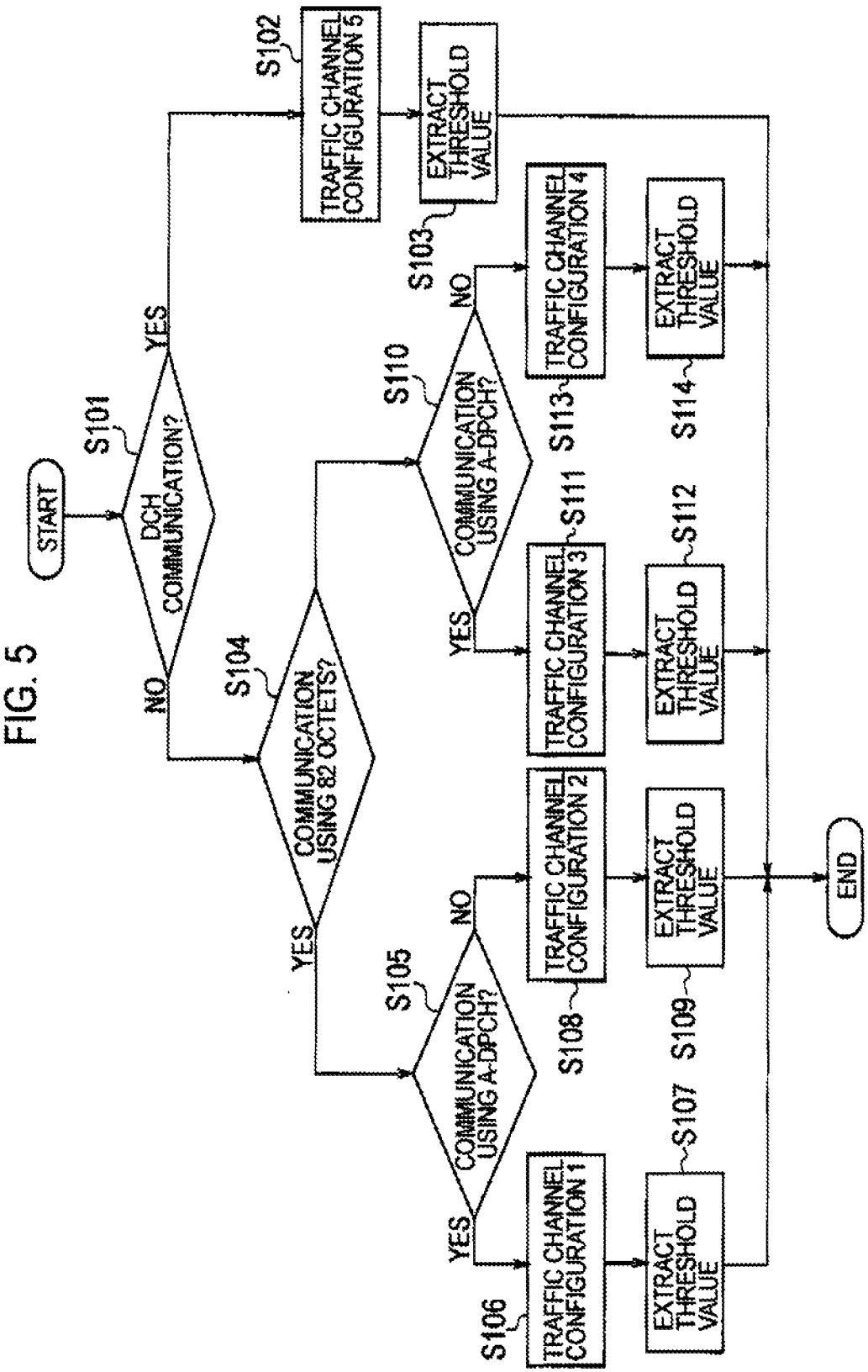
FIG. 5 is a flowchart showing an operation of the mobile communication system according to the first embodiment of the present invention.

For example, as shown in FIG. 5, when the traffic channel configuration of the mobile station UE is the traffic channel configuration for executing the HSDPA communication using the RLC-PDU size of 82 octets and using A-DPCH (if "YES" in Step S101, "YES" in Step S104, and "YES" in Step S105), the radio controller 03 extracts the threshold value "1-A" corresponding to the identifier "1" of the traffic channel configuration.

On the other hand, when the traffic channel configuration of the mobile station UE is the traffic channel configuration for executing the HSDPA communication using the RLC-PDU size of 82 octets and using F-DPCH (if "YES" in Step S101, "YES" in Step S104, and "NO" in Step S105), the radio controller 03 extracts the threshold value "1-B" corresponding to the identifier "2" of the traffic channel configuration.

Meanwhile, when the traffic channel configuration of the mobile station UE is the traffic channel configuration for executing the HSDPA communication using the RLC-PDU size of 42 octets and using A-DPCH (if "YES" in Step S101, "NO" in Step S104, and "YES" in Step S110), the radio controller 03 extracts the threshold value "1-C" corresponding to the identifier "3" of the traffic channel configuration.

When, on the other hand, the traffic channel configuration of the mobile station UE is the traffic channel configuration for executing the HSDPA communication using the RLC-PDU size of 42 octets and using F-DPCH (if "YES" in Step S101, "NO" in Step S104, and "NO" in Step S110), the radio controller 03 extracts the threshold value "1-D" corresponding to the identifier "4" of the traffic channel configuration.

Meanwhile, when the traffic channel configuration of the mobile station UE is the traffic channel configuration for executing the communication in the "CELL_DCH" state (if "NO" in Step S101), the radio controller 03 extracts the threshold value "1-E" corresponding to the identifier "5" of the traffic channel configuration.

In Step S15, the radio controller 03 determines whether or not to change the traffic channel configuration of the mobile station UE by comparing the extracted threshold value with the communication state.

Figures 6, 7:
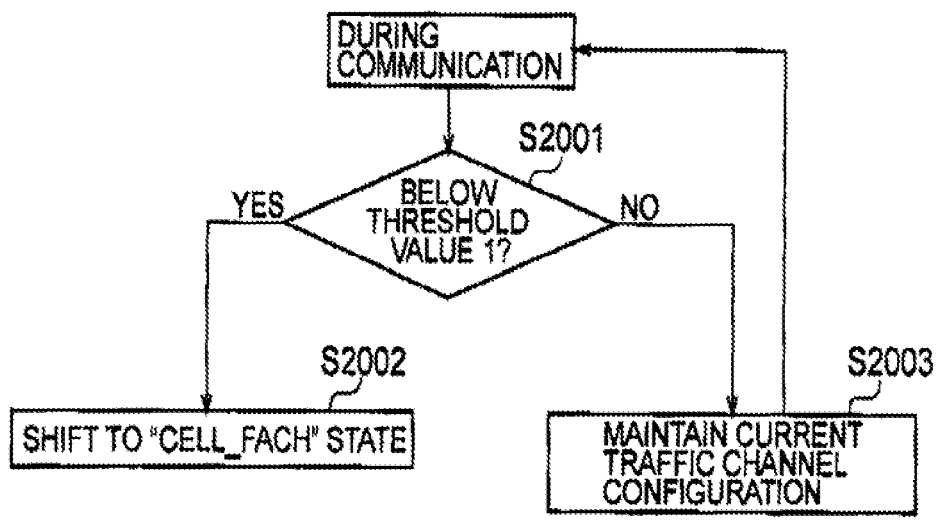
FIG. 6 is a flowchart showing an operation of the mobile communication system according to the first embodiment of the present invention.
FIG. 7 is a diagram showing an example of contents held by a threshold value holding unit in a radio controller according to Modification 1 of the present invention.

For example, as shown in FIG. 6, when the data flow rate is below the threshold value 1 extracted by the threshold value extraction unit 13 (if "YES" in Step S2001), the radio controller 03 determines in Step S2002 that the traffic channel configuration of the mobile station UE should be changed to the traffic channel configuration for executing the communication in the "CELL_FACH" state, i.e., the communication state of the mobile station UE should be changed to the "CELL_FACH" state. Then, in Step S106 shown in FIG. 4, the radio controller 03 changes the traffic channel configuration of the mobile station UE to the traffic channel configuration for executing the communication in the "CELL_FACH" state.

On the other hand, in the case where the data flow rate is not below the threshold value 1 extracted by the threshold value extraction unit 13 when the mobile station UE is performing the HSDPA communication (if "NO" in Step S2001), the radio controller 03 determines in Step S2003 that the traffic channel configuration of the mobile station UE should not be changed to the traffic channel configuration for executing the communication in the "CELL_FACH" state, i.e., the communication state of the mobile station UE should not be changed to the "CELL_FACH" state. Then, in Step S107 shown in FIG. 4, the radio controller 03 maintains the current traffic channel configuration of the mobile station UE without making any change.

(Advantageous Effects of Mobile Communication System According to First Embodiment of the Present Invention)

The mobile communication system according to the first embodiment of the present invention can perform flexible channel switch control in consideration of the traffic channel configuration of the mobile station UE, radio resource utilization efficiency and serviceability, since the radio controller 03 can set different threshold values for the different traffic channel configurations.

For example, when the mobile station UE executes the HSDPA communication using the RLC-PDU size of 42 octets and using A-DPCH, it is preferable, from the viewpoint of radio resource utilization efficiency, that the communication state of the mobile station UE is changed to the "CELL_FACH" state. Therefore, a significant value is set to the threshold value 1-C, thereby enabling an operation to facilitate the transition of the traffic channel configuration of the mobile station UE to the traffic channel configuration for executing the communication in the "CELL_FACH" state.

Meanwhile, when the mobile station UE executes the HSDPA communication using the RLC-PDU size of 82 octets and using F-DPCH, high radio resource utilization efficiency reduces the need to change the communication state of the mobile station UE to the "CELL_FACH" state. Moreover, switching the RLC-PDU size from 82 octets to 42 octets causes a data loss. For this reason, it is preferable, from the viewpoint of serviceability, that the communication state of the mobile station UE is not changed to the "CELL_FACH" state. Accordingly, a lower limit on the mobile communication system is set to the threshold value 1-B, thereby enabling an operation to make the traffic channel configuration of the mobile station UE unlikely to be changed to the traffic channel configuration for executing the communication in the "CELL_FACH" state.

Furthermore, when the mobile station UE executes the HSDPA communication using the RLC-PDU size of 82 octets and using A-DPCH, changing the communication state of the mobile station UE to the "CELL_FACH" state increases the radio resource utilization efficiency. However, switching the RLC-PDU size from 82 octets to 42 octets causes a data loss.

Therefore, it is possible to perform an operation such that a significant value is set to the threshold value 1-A if the reduction in serviceability due to the data loss is permissible, and that a lower limit on the mobile communication system is set to the threshold value 1-A despite the reduction in radio resource utilization efficiency if the reduction in serviceability due to the data loss is impermissible.

(Modification 1)

In this modification, as shown in FIG. 7, a threshold value holding unit 11 is configured to associate each of traffic channel configurations with at least one threshold value (threshold values 1 to 4 in the example shown in FIG. 7) and hold these associated traffic channel configurations and threshold values.

In the example shown in FIG. 7, the threshold value 1 is a threshold value for the data flow rate described above, the threshold value 2 is a threshold value for the radio resource utilization rate (such as CC utilization rate), the threshold value 3 is a threshold value for the number X of determinations made by a threshold value determination unit 14, and the threshold value 4 is a threshold value for the timer value described above.

Here, the radio resources may be not only the CC but also downlink transmission power from the radio base station 01 or resources in the radio controller 03.

Moreover, the threshold value determination unit 14 may be configured to determine whether or not to Change the traffic channel configuration of the mobile station UE by comparing the threshold value 1 extracted by the threshold value extraction unit 13 with the data flow rate.

In this case, in the case where the data flow rate is below the threshold value 1 when the mobile station UE is performing the HSDPA communication or the communication in the "CELL_DCH" state, the threshold value determination unit 14 may be configured to determine that the traffic channel configuration of the mobile station UE should be changed to the traffic channel configuration for executing the communication in the "CELL_FACH" state.

Furthermore, the threshold value determination unit 14 may be configured to determine whether or not to change the traffic channel configuration of the mobile station UE by comparing the extracted threshold value 2 with the radio resource utilization rate (such as CC utilization rate).

In this case, in the case where the radio resource utilization rate is below the threshold value 2 when the mobile station UE is performing the HSDPA communication or the communication in the "CELL_DCH" state, the threshold value determination unit 14 may be configured to determine that the traffic channel configuration of the mobile station UE should be changed to the traffic channel configuration for executing the communication in the "CELL_FACH" state.

Furthermore, the threshold value determination unit 14 may be configured to determine whether or not to change the traffic channel configuration of the mobile station UE by comparing the extracted threshold value 3 with the number of determinations made.

In this case, in the case where the number X of determinations is below the threshold value 3 when the mobile station UE is performing the HSDPA communication or the communication in the "CELL_DCH" state, the threshold value determination unit 14 may be configured to determine that the traffic channel configuration of the mobile station UE should be changed to the traffic channel configuration for executing the communication in the "CELL_FACH" state.

Furthermore, the threshold value determination unit 14 may be configured to determine whether or not to change the traffic channel configuration of the mobile station UE by comparing the extracted threshold value 4 with the timer value.

In this case, in the case where the timer value (remaining time before the expiration of the timer) is below the threshold value 4 when the mobile station UE is performing the HSDPA communication or the communication in the "CELL_DCH" state, the threshold value determination unit 14 may be configured to determine that the traffic channel configuration of the mobile station UE should be changed to the traffic channel configuration for executing the communication in the "CELL_FACH" state.

Note that when the threshold value determination unit 14 determines that the traffic channel configuration of the mobile station UE should be changed to the traffic channel configuration for executing the communication in the "CELL_FACE" state in all the determinations made using the threshold values 1 to 4 described above, the traffic channel configuration switching unit 15 maybe configured to switch the traffic channel configuration of the mobile station UE to the traffic channel configuration for executing the communication in the "CELL_FACH" state.

Alternatively, when the threshold value determination unit 14 determines that the traffic channel configuration of the mobile station UE should be changed to the traffic channel configuration for executing the communication in the "CELL_FACH" state in at least one of the determinations made using the threshold values 1 to 4 described above, the traffic channel configuration switching unit 15 may be configured to switch the traffic channel configuration of the mobile station UE to the traffic channel configuration for executing the communication in the "CELL_FACH" state.

When the results of the determinations made by the threshold value determination unit 14 using the threshold values 1 to 4 described above satisfy predetermined conditions, the traffic channel configuration switching unit 15 may be configured to switch the traffic channel configuration of the mobile station UE to the traffic channel configuration for executing the communication in the "CELL_FACH" state.

The features of this embodiment described above may be expressed as follows.

The first feature of this embodiment is the radio controller 03 including: the threshold value holding unit 11 configured to associate the traffic channel configuration with at least one of the threshold values 1 to 4 and hold these associated traffic channel configuration and threshold value; the threshold value extraction unit 13 configured to extract at least one of the threshold values 1 to 4 associated with the traffic channel configuration of the mobile station UE, and the threshold value determination unit 14 configured to determine whether or not to change the traffic channel configuration of the mobile station UE by comparing the extracted threshold values 1 to 4 with the communication state at a predetermined timing.

In the first feature of this embodiment, the threshold value determination unit 14 may be configured to determine whether or not to change the traffic channel configuration of the mobile station UE by comparing the extracted threshold value 1 with the data flow rate.

In the first feature of this embodiment, the threshold value determination unit 14 may be configured to determine whether or not to change the traffic channel configuration of the mobile station UE by comparing the extracted threshold value 2 with the radio resource utilization rate (such as CC utilization rate).

In the first feature of this embodiment, the threshold value determination unit 14 may be configured to determine whether or not to change the traffic channel configuration of the mobile station UE by comparing the extracted threshold value 3 with the number of determinations already made.

In the first feature of this embodiment, the threshold value determination unit 14 may be configured to determine whether or not to change the traffic channel configuration of the mobile station UE by comparing the extracted threshold value 4 with the timer value.

In the first feature of this embodiment, the threshold value determination unit 14 may be configured to determine whether or not to change the traffic channel configuration of the mobile station UE when the mobile station UE starts communication or when the traffic channel configuration of the mobile station UE is to be changed.

A second feature of this embodiment is a mobile communication method including the steps of: extracting, by the radio controller 03, at least one of the threshold values 1 to 4 associated with the traffic channel configuration of the mobile station UE from the threshold value holding unit 11; determining, by the radio controller 03, whether or not to change the traffic channel configuration of the mobile station UE by comparing the extracted threshold values 1 to 4 with the communication state at a predetermined timing; and changing the traffic channel configuration of the mobile station UE depending on the determination result.

Note that operations of the above-described radio base station 01, mobile station UE, and radio controller 03 may be implemented by hardware or may be implemented by a software module to be executed by a processor, or may be implemented in combination of the both.

The software module may be provided in any type of storage medium such as a RAM (Random Access Memory), a flash memory, a ROM (Read Only Memory), an EPROM (Erasable Programmable ROM), an EEPROM (Electronically Erasable and Programmable ROM), a register, a hard disk drive, a removable disk, or a CD-ROM.

The storage medium is connected to the processor so that the processor can read and write information from and to the storage medium. Also, the storage medium may be integrated into the processor. Also, the storage medium and the processor may be provided in an ASIC. The ASIC may be provided in the radio base station 01, the mobile station UE, or the radio controller 03. Also, the storage medium and the processor may be provided in the radio base station 01, the mobile station UE, or the radio controller 03 as a discrete component.

Hereinabove, the present invention has been described in detail using the above embodiment, however, it is apparent to those skilled in the art that the present invention is not limited to the embodiment described herein. Modifications and variations of the present invention, can be made without departing from the spirit and scope of the present invention defined by the description of the scope of claims. Thus, what is described herein is for illustrative purpose, and has no intention whatsoever to limit the present invention.

The invention claimed is:

1. A radio controller comprising:
   circuitry configured to:
   associate a traffic channel configuration of a mobile station with a plurality of threshold values and hold an association of the traffic channel configuration and the plurality of threshold value;
   extract the plurality of threshold values associated with the traffic channel configuration of the mobile station; and
   determine whether to change the traffic channel configuration of the mobile station to a traffic channel configuration that performs communication in a CELL_FACH state when a pattern of communication states derived from extracted threshold values satisfies a predetermined condition, wherein
   the traffic channel configuration of the mobile station includes a traffic channel configuration that performs High Speed-Downlink Packet Access (HSDPA) communication using an Associated Dedicated Physical Channel (A-DPCH) and a traffic channel configuration that performs HSDPA communication using a Fractional Dedicated Physical Channel (F-DPCH), and
   the pattern differs based on whether the mobile station communicates using the A-DPCH or the F-DPCH.

2. The radio controller according to claim 1, wherein the circuitry is further
   configured to determine whether to change the traffic channel configuration of the mobile station further based on comparing the extracted threshold values with a data flow rate.

3. The radio controller according to claim 1, wherein the circuitry is further
   configured to determine whether to change the traffic channel configuration of the mobile station further based on comparing the extracted threshold values with a radio resource utilization rate.

4. The radio controller according to claim 1, wherein the circuitry is further
   configured to determine whether to change the traffic channel configuration of the mobile station further based on comparing the extracted threshold values with a number of determinations already made.

5. The radio controller according to claim 1, wherein the circuitry is further
   configured to determine whether to change the traffic channel configuration of the mobile station further based on comparing the extracted threshold values with a timer value.

6. The radio controller according to claim 1, wherein the circuitry is further
   configured to determine whether to change the traffic channel configuration of the mobile station when the mobile station starts communication.

7. A mobile communication method comprising the steps of:
   extracting, by a radio controller, a plurality of threshold values associated with a traffic channel configuration of a mobile station from a threshold value storage;
   determining, by the radio controller, whether to change the traffic channel configuration of the mobile station to a traffic channel configuration that performs communication in a CELL_FACH state when a pattern of communication states derived from that extracted threshold values satisfies a predetermined condition; and
   changing the traffic channel configuration of the mobile station depending on the determining, wherein
   the traffic channel configuration of the mobile station includes a traffic channel configuration that performs High Speed-Downlink Packet Access (HSDPA) communication using an Associated Dedicated Physical Channel (A-DPCH) and a traffic channel configuration that performs HSDPA communication using a Fractional Dedicated Physical Channel (F-DPCH), and
   the pattern differs based on whether the mobile station communicates using the A-DPCH or the F-DPCH.

* * * * *